Patented July 13, 1926.

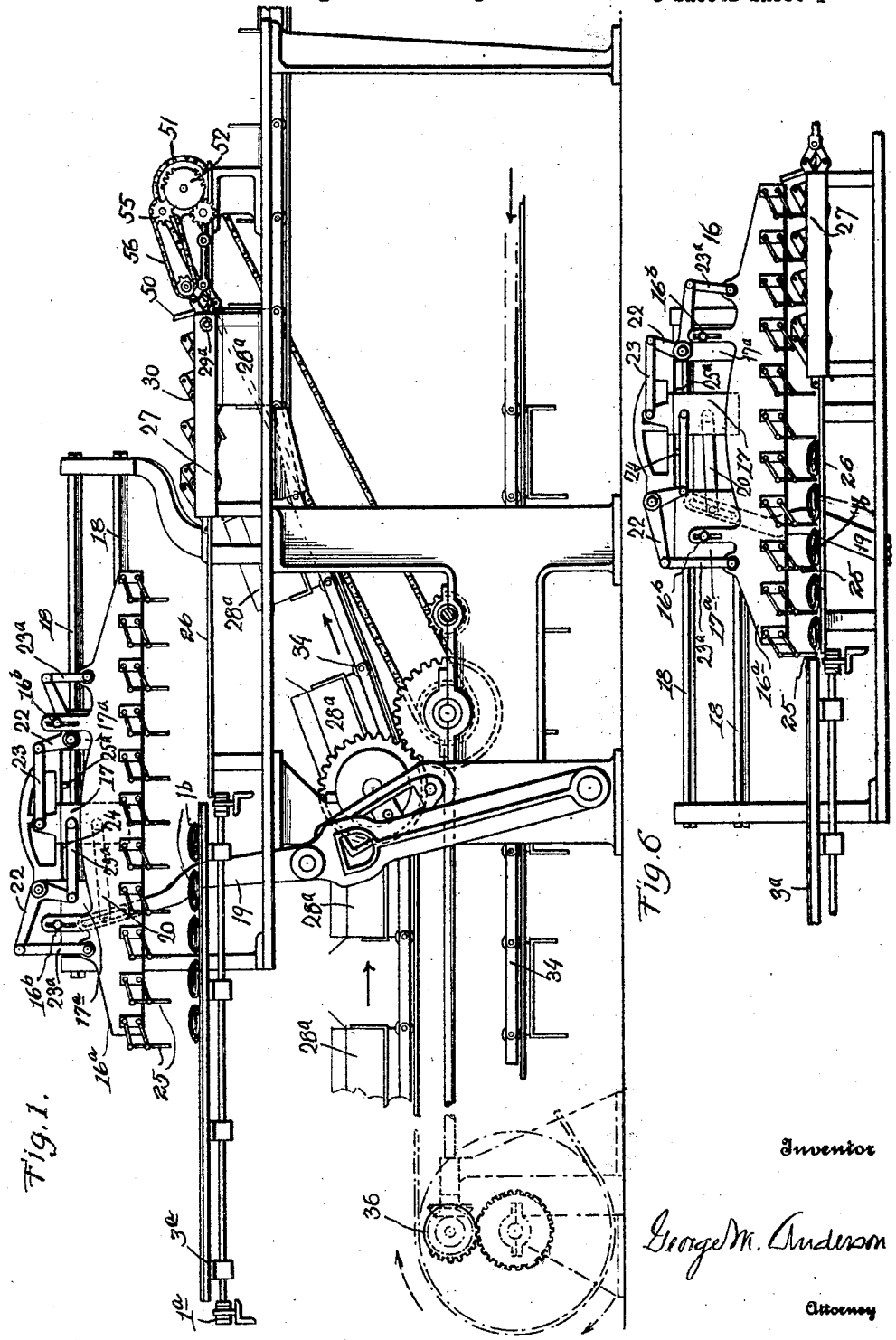

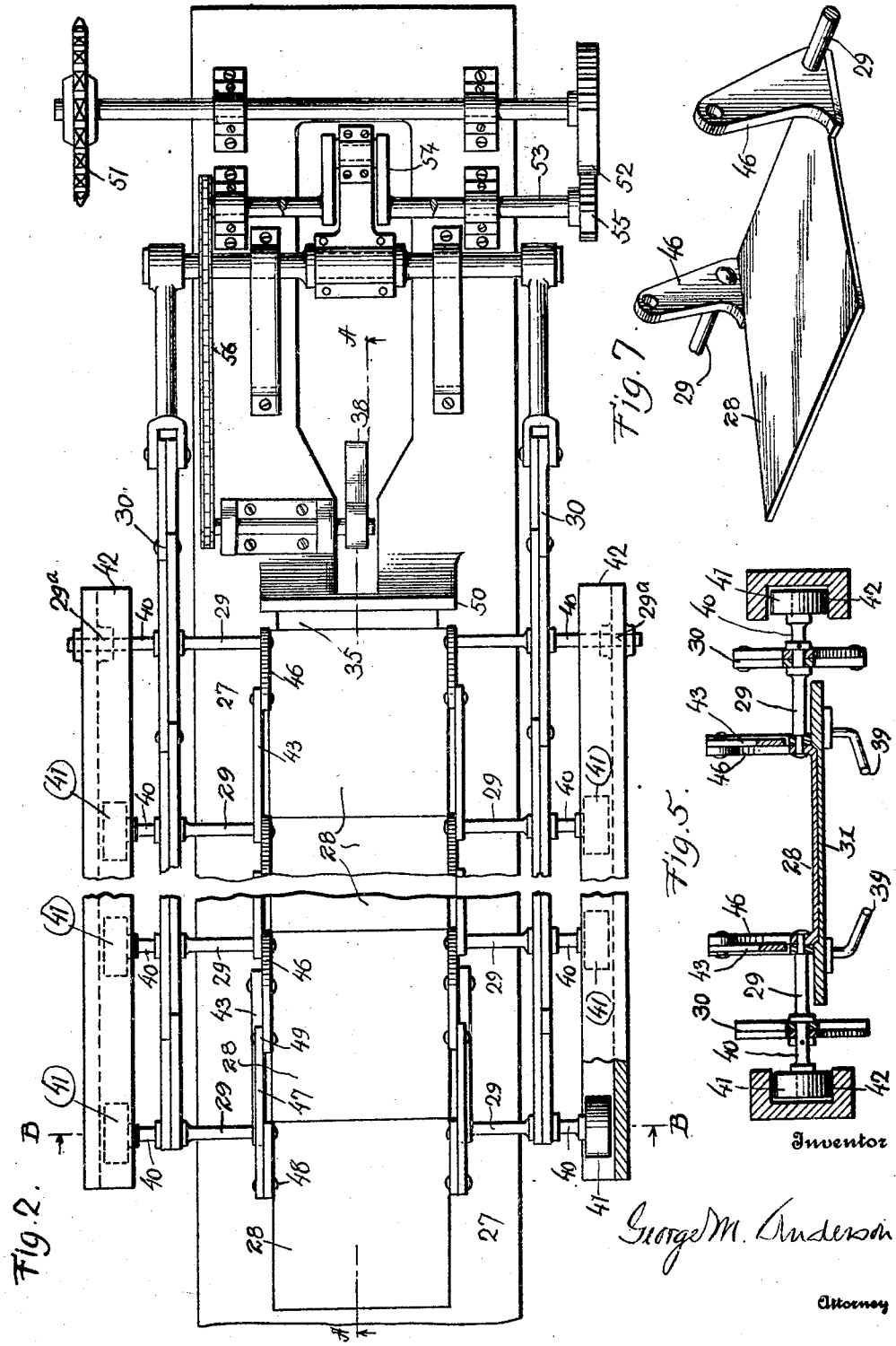

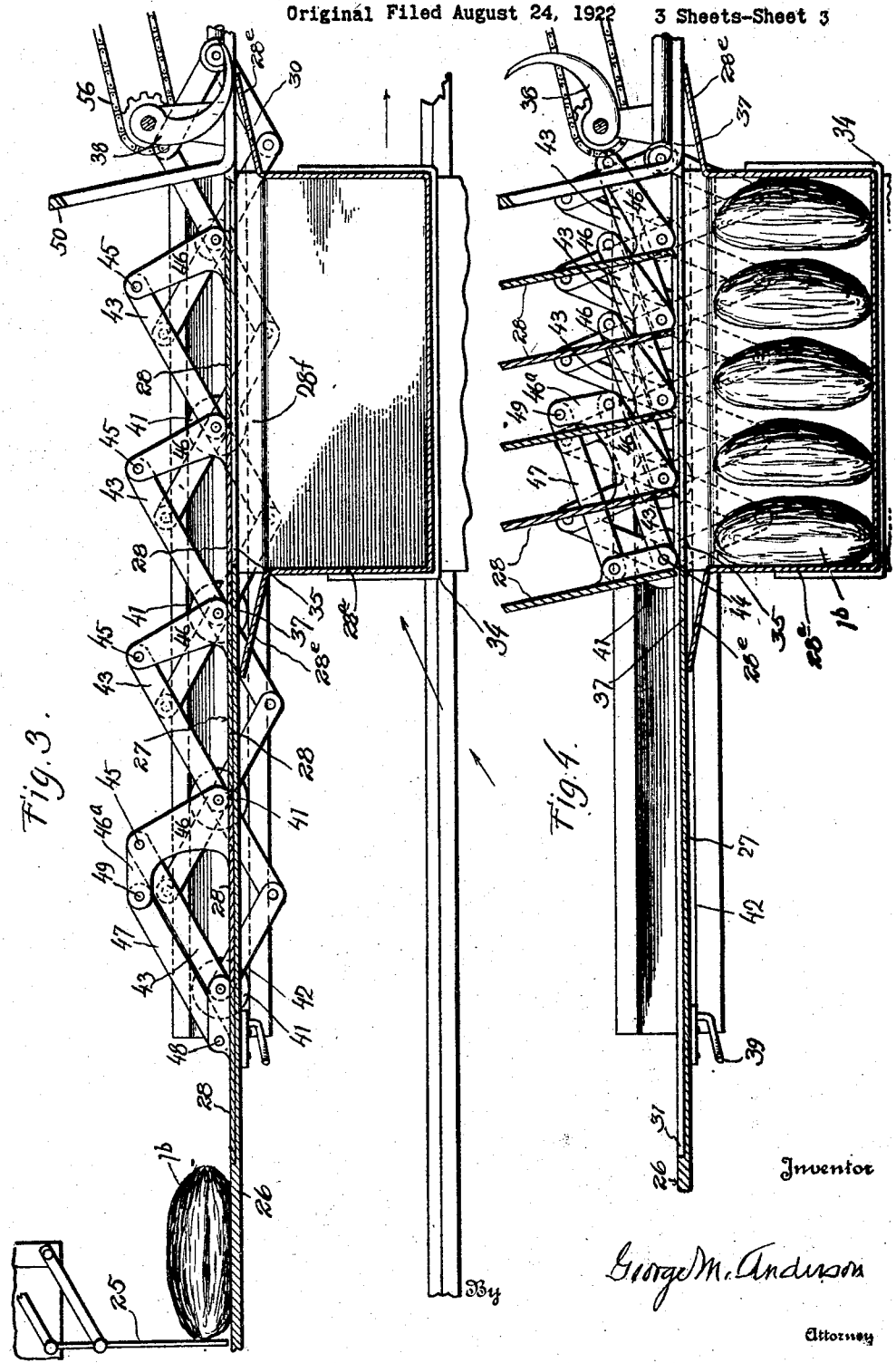

1,591,949

UNITED STATES PATENT OFFICE.

GEORGE M. ANDERSON, OF WASHINGTON, DISTRICT OF COLUMBIA, ASSIGNOR TO THE SHREDDED WHEAT COMPANY, OF NIAGARA FALLS, NEW YORK, A CORPORATION OF NEW YORK.

MACHINE FOR PACKING BISCUITS.

Application filed August 24, 1922, Serial No. 584,015. Renewed November 10, 1925.

This invention relates to machines for packing food products in cartons, and is arranged to introduce groups of articles successively into cartons to fill the latter. The invention is particularly adapted for the packing of food products of a delicate structure, such as shredded wheat biscuits which are quite fragile and must be handled with great care in order to prevent damage. Accordingly, an adaptation of the invention suitable for that purpose will be described, though it is to be understood that its utility is not limited to the type of product acted on.

The machine of the present invention may conveniently be used in connection with a baking machine which includes a conveyor having pans on which the biscuits are carried through an oven chamber, and the machine comprises means for withdrawing the biscuits from the conveyor and introducing them into cartons brought successively into proper position.

In one form of baking machine the biscuits are carried on the conveyor in rows which extend transverse to the latter and in the operation of the present baking machine groups of biscuits are removed from the successive pans, transferred as a group to the point where the baking operation takes place, each biscuit being kept under separate control in this removal and transfer, and then the biscuits of the group are individually turned up on edge and permitted to pass vertically into the carton.

A machine constituting one embodiment of the present invention is illustrated in the accompanying drawings, in which—

Figure 1 is a side view of the invention, as applied, with parts broken away, the rake being shown in elevated position.

Figure 2 is a plan view of a portion of the same, with parts broken away and parts removed.

Figure 3 is a section on the line A—A, Figure 2.

Figure 4 is a similar view with the shutters raised to discharging position and showing the biscuit in the carton.

Figure 5 is a section on the lne B—B, Figure 2.

Figure 6 is a detail view of the biscuit removal means, showing five biscuit as moved from the conveyor upon the inspection platform, with the rake in position engaging said biscuit.

Figure 7 is a detail perspective view of one of the shutters.

Referring now to the accompanying drawings, a portion of the baking conveyor is designated $1^a$ and this conveyor has a succession of transverse trays or pans $3^a$ in each of which is carried a row of biscuits $1^b$ placed side by side. These trays are brought successively into registry with the removal device, which is generally designated 16, and this device at each operation removes a group of biscuits from the conveyor and deposits these biscuits on an inspection platform 26.

The biscuits arranged in the tray in a row are moved to the platform in single file and the rake is provided with blades 25, each of which pushes a biscuit in front of it in the removal operation. There is a greater number of blades 25 than there are biscuits in a group removed from the conveyor at each operation of the device, and accordingly the biscuits are moved along the platform 26 in successive steps, finally being deposited on surfaces 28. These surfaces take the form of tiltable shutters, one for each biscuit, and in the operation of the device, as soon as a group of biscuits is deposited on these shutters, the shutters are tilted to an upright position and simultaneously moved toward each other. Prior to this movement an opened carton has been advanced to filling position, and when the shutters are tilted on edge, the biscuits slide from between the shutters and are deposited vertically in the carton, as shown in Fig. 4.

Upon each stroke of the rake 16, five biscuit are removed from the aligned tray $3^a$ upon the inspection table 26 aforesaid, and five biscuit (previously removed from the conveyor by said rake) are removed from said platform upon the shutter platform 27, the rake in the present instance having eleven teeth.

The rake device operates intermittently to remove biscuit as stated, and during its return movement in elevated position, the shutter platform 27 is operated and caused to assume an upright position whereby the biscuit previously resting in horizontal position thereon are now raised to upright parallel position and caused to fall through force of gravity through the openings between the upright shutters into the open tops of the cartons or boxes 28ª, which are fed successively by the conveyor 34 into registration with the opening 35 of the platform 27.

The conveyor 34 may be intermittently operated by gearing 36, or said conveyor may be moved continuously, as may be desired.

As the cartons are carried along by said conveyor, the end top flap 28ᵉ at one end is engaged by the end portion 37 of the platform 27 marginal to the opening 35, and held down in outwardly folded position at the time of the discharge of the biscuit into the carton, the other top end flap 28ᵉ being simultaneously engaged by a cam 38, timed properly and assuring that these two end flaps do not interfere with the proper charging of the cartons.

At the time that the carton is fed by the conveyor 34 into registry with the opening 35, its side top flaps 28ᶠ are engaged by spreader device 39, acting to fold these flaps outwardly, said flaps being thereafter engaged with the side of the platform 27 marginal to the opening 35, and thereby held out of the way of the biscuit being discharged into the cartons.

The center pivots of the lazy tongs are provided with extensions 40, provided with rollers 41, traveling upon tracks 42.

Movement is imparted to the shutters 28 to adjust the same as stated by means of links 43, respectively pivotally connected at one end to the center pivot of the related lazy tongs link and at its other end at 45 to the outer end of an extension 46 in the nature of a crank extension of the related shutter. The links 43 and the extensions 46 are duplicated for each shutter 28 at opposite sides thereof and the lazy tongs are also provided in duplicate and located at opposite sides of the shutters, it being understood that the center pivot extension 40 of the lazy tongs near the forward end of said tongs is stationary, having a bearing in the framing at 29ª. A link 47 has pivotal connection at 48 to the last shutter 28 at one end of the series and at its other end at 49 to an extension 46ª, being an elongation of the part 46 of the next adjacent shutter 28, the purpose being to exert a pulling action by said link 47 upon said endmost shutter in order that it may be adjusted in accord with the other shutters 28.

In order that the endmost biscuit in advance of the others may be prevented from falling over forwardly when it is raised to upright position by the shutter whereon it rests, the platform 27 is provided with an upright lug or projection 50, having a high inclination, similar to the inclination of the shutters 28 when adjusted to raised position, and located in advance of the shutters and spaced apart from said endmost shutter, or shutter whereon the most advanced biscuit rests, by an interval similar to that separating adjacent shutters when raised to discharging position.

The lazy tongs 30 and the shutters 28 are operated by sprocket gearing 51, having Geneva gearing connection 52 with the crank shaft 53, the crank 54 of said shaft being connected to said lazy tongs. Geneva gearing 55 has driving connection with the gearing 52 and sprocket gearing connection 56 with the cam 38.

The biscuit removal means will be briefly described as follows:

A reciprocatory head 17 is slidable upon guide rods 18, being operated by lever 19, having link connection 20, with said head, the latter consisting of a main head 17ª, also slidable upon said rods, and the head 17, termed a supplementary head, and being given a reciprocatory movement of greater degree than is the head 17ª.

The rake 16 has a frame 16ª, which is provided with a slot and pin connection 16ᵇ, with the head 17ª, whereby it is moved as a unit with said head horizontally, but is capable of independent vertical reciprocatory movement.

The head 17 is moved in one direction by the aforesaid lever and link towards the conveyor 1ª, to thereby operate the bell levers 22, through links 23 and 23ª, and elevate the rake frame 16ª, until the head 17 contacts with stops 24 of the head 17ª, after which the two heads 17 and 17ª are moved as a unit, the rake being in elevated position, until the rake is properly located over the conveyor 1ª.

In the return movement of the parts, the head 17 is first moved to operate the bell levers 22 and depress the rake 16, so that its teeth 25 will engage between a predetermined number (five in the present case) of the biscuit in the tray 3ª of the conveyor, after which the said head contacts with stops 25ª and the heads 17 and 17ª are moved as a unit with the rake in depressed position to remove a row of five aligned biscuit simultaneously from said conveyor and transversely thereof, during the stoppages consequent upon the intermittent movement of the conveyor.

I claim:

1. In a machine for packing biscuit, means for successively feeding cartons, a conveyor, and means for successively removing transverse rows of horizontally positioned biscuit each row as a unit from said conveyor and delivering the same rows with the biscuit vertically positioned to said cartons each row as a unit to a carton.

2. In a machine for packing biscuit, means for successively feeding cartons, a conveyor, and means for removing successively rows of horizontally positioned biscuit each row as a unit in single file from said conveyor and delivering the same rows with the biscuit vertically positioned to said cartons each row as a unit to a carton.

3. In a machine for packing biscuit, means for successively feeding cartons, a conveyor, and means for removing successively transverse rows of horizontally positioned biscuit each row as a unit in single file from said conveyor and delivering the same rows with the biscuit vertically positioned to said cartons each row as a unit to a carton.

4. In a machine for packing biscuit, means for successively feeding cartons, a conveyor, and means for removing successively transverse rows of horizontally positioned biscuit each row as a unit from said conveyor and delivering the same rows with the biscuit vertically positioned to said cartons each row as a unit to a carton with the lateral faces of the biscuit opposite and in approximate contact.

5. In a machine for packing biscuit, means for successively feeding cartons, a conveyor, and means for removing successively rows of horizontally positioned biscuit each row as a unit in single file from said conveyor and delivering the same rows with the biscuit vertically positioned to said cartons each row as a unit to a carton with the lateral faces of the biscuit opposite and in approximate contact.

6. In a machine for packing biscuit, means for successively feeding cartons, a conveyor, and means for removing successively transverse rows of horizontally positioned biscuit each row as a unit in single file from said conveyor and delivering the same rows with the biscuit vertically positioned to said cartons each row as a unit to a carton with the lateral faces of the biscuit opposite and in approximate contact.

7. In a machine for packing biscuit, a conveyor, means for successively feeding cartons, and means for successively removing biscuit from said conveyor and delivering the same to said cartons, adapted to shift the biscuit from parallel horizontal position to parallel upright position, including a platform whereon the biscuit are moved and made up of tiltable slats, and means for tilting said slats and simultaneously bringing the same more nearly together.

8. In a machine for packing biscuit, a conveyor, means for successively feeding cartons, and means for successively removing biscuit from said conveyor and delivering the same to said cartons, adapted to shift the biscuit from parallel horizontal position to parallel upright position, including a platform whereon the biscuit are moved and made up of tiltable slats, and means for tilting said slats and simultaneously bringing them more nearly together, adapted to accomplish both functions by a single operative movement.

9. In a machine for packing biscuit, a conveyor, means for successively feeding cartons, and means for successively removing biscuit from said conveyor and delivering the same to said cartons, adapted to shift the biscuit from parallel horizontal position to parallel upright position, including a platform whereon the biscuit are moved and made up of tiltable slats, and means including lazy tongs for tilting said slats and simultaneously bringing them more nearly together.

10. In a machine for packing biscuits, means for feeding a succession of cartons to a point at which they are to be filled, means for feeding groups of biscuits successively, each biscuit lying flat, and means for receiving biscuits so fed, a group at a time, turning the biscuits individually on edge, and then introducing the biscuits as a group vertically into a carton, the said means including a receiving surface for each biscuit lying in a plane above the carton to be filled and means for tilting the surfaces simultaneously about parallel horizontal axes.

11. In a machine for packing biscuits, means for feeding a succession of cartons with their tops open to a position in which they are to be filled, means for feeding groups of biscuits successively toward the carton in position to be filled, each biscuit lying flat, a receiving surface on which each biscuit in a group is deposited, and means for tilting the receiving surfaces to upright position and moving these surfaces toward each other to a position over a carton whereby the biscuits are turned on edge and permitted to slide from the surfaces vertically into the carton.

In testimony whereof I affix my signature.

GEORGE M. ANDERSON.